Feb. 6, 1940.  C. O. LAVETT  2,188,908

PROCESS FOR COAGULATING PROTEINS IN LIQUOR

Filed Dec. 13, 1937  2 Sheets-Sheet 1

INVENTOR
Charles O. Lavett
BY
ATTORNEYS

Feb. 6, 1940.   C. O. LAVETT   2,188,908
PROCESS FOR COAGULATING PROTEINS IN LIQUOR
Filed Dec. 13, 1937   2 Sheets-Sheet 2

INVENTOR
Charles O. Lavett
BY
ATTORNEYS

Patented Feb. 6, 1940

2,188,908

UNITED STATES PATENT OFFICE 2,188,908

PROCESS FOR COAGULATING PROTEINS IN LIQUOR

Charles O. Lavett, Buffalo, N. Y., assignor to Buffalo Foundry & Machine Co., Buffalo, N. Y., a corporation of New York Application December 13, 1937, Serial No. 179,403

11 Claims. (Cl. 99—57)

This invention relates to a process and apparatus for coagulating protein in whey, or similar protein bearing liquor, by heat for the purpose of keeping the protein throughout the coagulating process in suspension and uniformly distributed throughout the liquor so that the same can be subsequently more readily reduced in water content by evaporation and converted into a practically dry product by a dryer. The process also, of course, preheats the liquor thereby facilitating the subsequent drying process.

This application is a continuation in part of my copending application Ser. No. 45,091, filed October 15, 1935, for Dried whey and method of producing the same.

It is the object of this invention to provide a continuous process and apparatus whereby this result is attained efficiently and economically and by means which are simple in construction and readily operable and in which the tendency of the coagulating protein to coat the heating surfaces is reduced.

In the accompanying drawings.

In the following description similar characters of reference indicate like parts in the several figures of the drawings.

Figure 1:
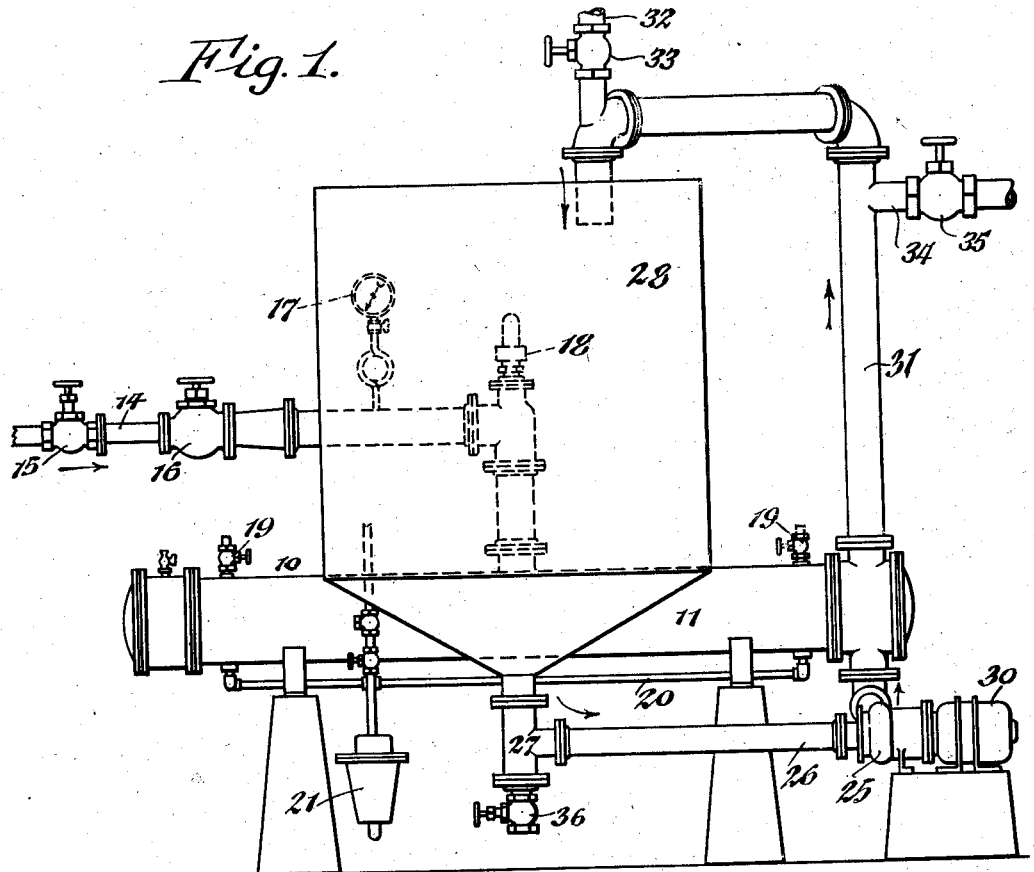
Fig. 1 is a side elevation of an apparatus for use in operating this process.
Figure 2:
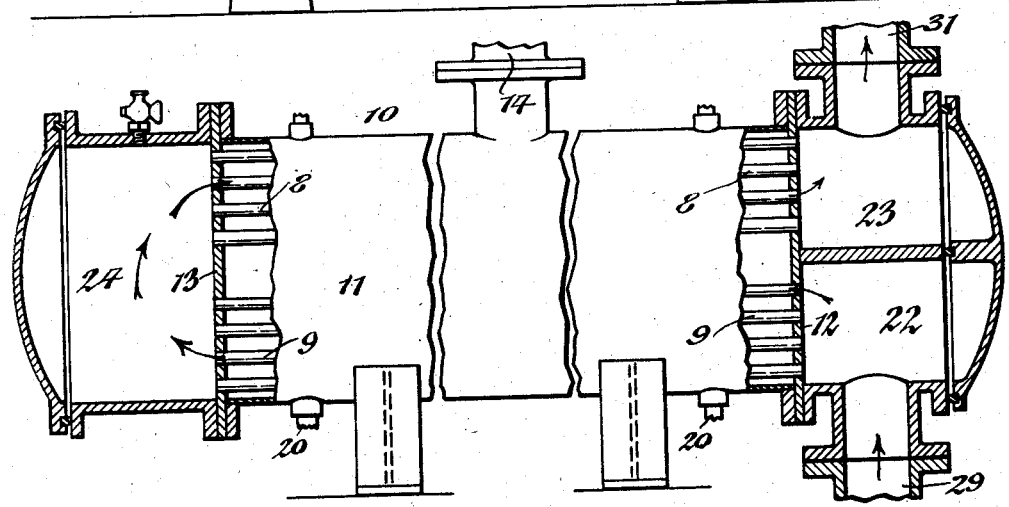
Fig. 2 is a fragmentary longitudinal section, on an enlarged scale, of a liquor heater forming part of the apparatus for practicing this invention.

Although this process is more particularly intended for treating whey, the same is equally useful in treating other liquors containing protein in order to aid in subsequently concentrating or drying the liquor to enable the same to be advantageously marketed as animal feed or for other purposes.

Whey is a solution of lactose, protein and mineral salts which are left after fat and casein have been removed from whole milk in the manufacture of cheese, or casein has been removed from skim milk in the manufacture of casein or cottage cheese.

The raw whey contains approximately 6% of solids and to recover this product in the form of a dry substance it is necessary to remove a large quantity of water. A very large percentage of water can be removed economically in a multiple effect evaporator.

In concentrating this liquid in an evaporator any uncoagulated and coagulable protein which comes in immediate contact with the heating surfaces, particularly if the liquid moves slowly over the hot surfaces, coagulates and adheres to the heating surface, building up a coating thereon, which insulates the surface and retards the flow of heat from the heating medium to the liquid. With the coagulation of the proteins some of the salts, where present, may also become insoluble by heating. Mixed with the proteins these precipitated salts generally form a very hard crust on the heating surface. With such a coating, the evaporation rapidly decreases and to compensate for this to some extent the steam pressure has heretofore been raised gradually to increase the temperature of the heating medium. The coating of solids, however, continues to accumulate on the heating surfaces to a point where, after a few hours of operation, it is necessary to shut down and clean the heating surfaces. This coating sticks tenaciously to the heating surfaces and can only be removed with difficulty.

Other difficulties are encountered where the liquor containing uncoagulated and coagulable protein is being dried as a layer or film on an atmospheric surface dryer. When concentrating in a thin layer on the surface of an internally heated, revolving drum such proteins, if not previously coagulated, will coagulate on the drum surface. In that case the liquor will become very viscous, vapor cannot escape freely, evaporation becomes impeded and the protein will separate in large particles which form irregular patches on the drum surface, thereby producing a concentrated product of uneven composition. With a pair of drums, forming a trough, to which the partially concentrated liquor is fed, some of the coagulation takes place in the trough but not to a sufficient extent to eliminate the difficulty on the drum surfaces.

According to the present invention the whey or protein bearing liquor, is heated to a temperature between 190° F. and 212° F. and for a sufficient length of time to coagulate the greater part of the proteins which coagulate in this temperature range. In order to maintain a high velocity of the liquor passing through the heater, the liquor is rapidly recirculated through the heater at a rate far in excess of the quantity fed to the evaporator, thereby to keep the coagulated protein in finely divided condition and maintain a small temperature difference between the liquor and the heating medium. To extend the period of coagulation by means of an increase in the volume of liquor in process of coagulation and thereby provide a process in which substantial amounts of raw liquor can be continuously admitted for coagulation and liquor bearing coagulated protein continuously withdrawn, the liquor under treatment is preferably recirculated through a holding vat of substantial proportions. By providing a volume of liquor in circulation which is relatively large compared to the amounts admitted and withdrawn, the temperature of the liquor admitted is raised rapidly to give as much opportunity as possible for coagulation in the vat and before the liquor enters the tubes of the preheater. This also serves to provide a small temperature difference between the liquor in the heater and the heating medium for the heater, which small temperature difference helps to prevent the coating of the tubes in the heater as coagulation progresses.

It has been found that by keeping the protein in suspension during coagulation and by substantially coagulating the proteins before any concentrating or drying operation, the tendency of the liquor to coat the heating surfaces of the heater, or subsequent evaporators or dryers is largely eliminated; that the subsequent evaporation and drying of the liquor can be continued for a large period of time with constant steam pressure and at maximum efficiency, and that the formation of hard scale is materially reduced, if not wholly eliminated, and thus necessitates less frequent shutdown for cleaning purposes.

Although the apparatus for utilization of this process may be variously organized, the same is preferably constructed as follows:

Referring to the drawings, the numeral 10 represents a heater in which the temperature of the liquid is rapidly raised to 190° F.–212° F. by means of steam. This heater may be of any suitable construction, the one shown in the drawings being satisfactory and comprising a steam chest having an outer horizontal shell 11, front and rear tube sheets 12, 13 and upper and lower groups of tubes 8, 9, connecting the corresponding parts of tube sheets. Steam is supplied by a pipe 14 connecting with the upper part of the heater shell and provided with a main control valve 15, a reducing valve 16, a pressure gauge 17 and a safety valve 18. On its upper side the shell of the steam chest is provided with a vent valve 19 and on its bottom the same is connected with pipes 20 which carry the water of condensation to a steam trap 21 of usual and well known construction. At its front end the heater is provided with liquor inlet and outlet chambers 22, 23 which communicate, respectively, with the front ends of the lower and upper groups of liquor heating tubes, and at its rear end the heater is provided with a transfer chamber 24 which connects the rear ends of the two groups of tubes and thus causes the liquor to make two passes while flowing successively through the lower and upper tubes.

Figure 3:
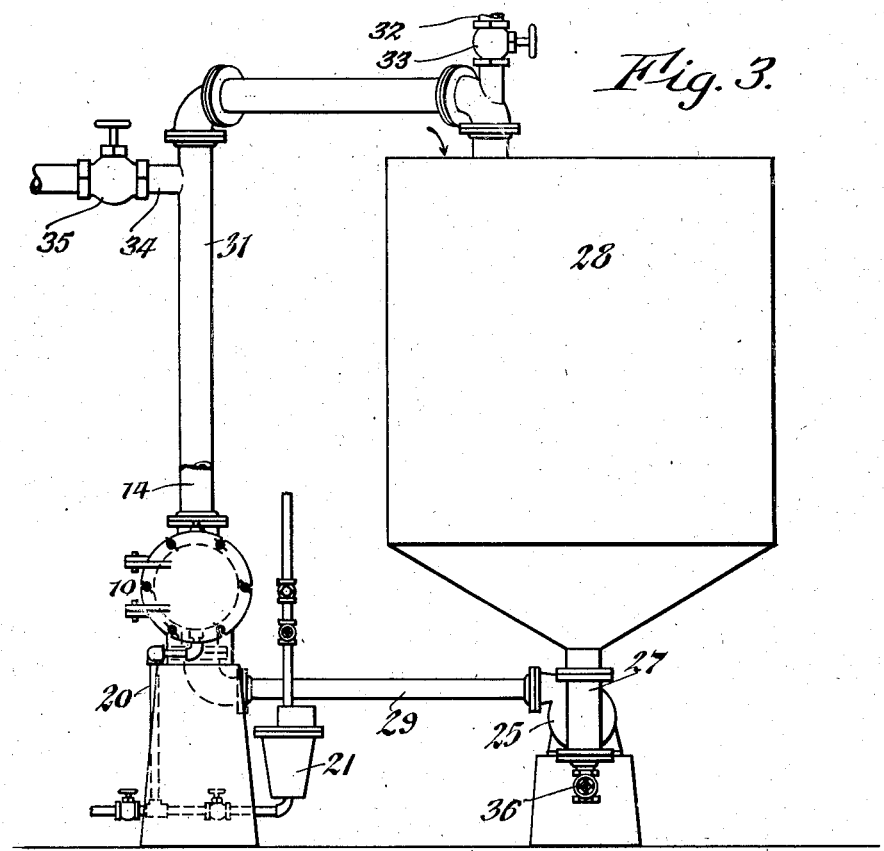
Fig. 3 is an end elevation of the apparatus shown in Fig. 1.
Figure 4:
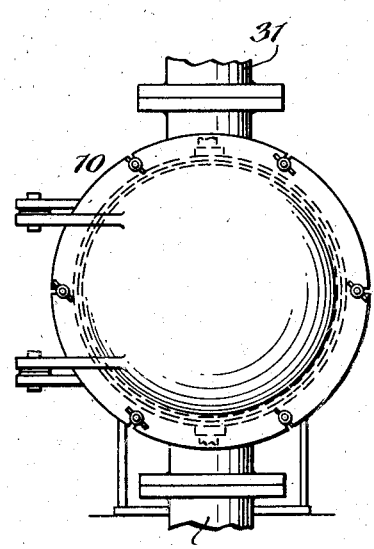
Fig. 4 is an end elevation, on an enlarged scale, of the heater for heating the liquor in accordance with this process.

The numeral 25 represents a pump, preferably of the rotary type which has its inlet connected by a pipe 26 and T fitting 27 with the lower end of a liquor holding vat or tank 28 while the outlet of this pump is connected by a pipe 29 to the chamber 22 of the heater. Any suitable prime mover may be employed for operating the pump, for example, an electric motor 30, as shown in Fig. 1. The outlet chamber 23 of the heater is connected with a pipe 31 which discharges into the open upper end of the holding vat 28, as shown in Figs. 1 and 3.

The raw liquor may be supplied to a suitable part of this apparatus from any available source, a supply pipe 32 being connected, for example, to the top of the return line 31 and provided with a liquor inlet valve 33. Delivery of the treated liquor from this apparatus to an evaporator and dryer may be accomplished by a discharge pipe 34 connected with the pipe 31 between the heater and the supply pipe 32 and containing a valve 35 for controlling the discharge of the liquor from this apparatus. To permit of cleaning, inspecting and repairing the apparatus, a drain valve 36 is connected with the T fitting 27 or other available part of the piping which valve is normally closed when the apparatus is in use.

Assuming that the apparatus is fully in operation the process of treating whey or other protein bearing liquor is as follows:

The liquor contained in the vat 28 is maintained at a temperature which will effect coagulation of proteins contained in the liquor admitted through the pipe 32. Therefore the initial coagulation of the proteins contained in this feed liquor takes place in this vat. The pump 25, operated by the motor 30, draws liquor from the lower end of the vat 28 and discharges this liquor into the heater in which the liquor upon flowing through the two passes formed by the lower and upper group of tubes is rapidly raised in temperature above the temperature of the liquor contained in the vat so as to maintain the liquor in the vat at the desired temperature to effect coagulation in the vat. The liquor after passing through the heater is returned through the pipe 31 to the vat 28. Because of the relatively large volume of liquor maintained within the vat 28 the differential between the temperature of the liquor in the vat and the temperature to which the liquor is heated in passing through the heater is relatively small, thereby reducing the tendency of coating the tubes of the heater. Since the greater part of the coagulation of the proteins is effected in the vat 28 before entering the heater, any tendency to coat the tubes of the heater is further reduced. Further, the constant recirculation of the liquor by the pump 25 tends to keep the coagulated protein in finely divided form and in suspension.

By feeding the raw liquor to the top of the vat at a point as remote as possible from the pump suction, and preferably into the discharge from the pump into the vat, and withdrawing part of the heated liquor from the pipe 31 as close as possible to the point of feed of the raw liquor, the greatest possible period of time is provided for coagulation of the proteins. It will also be noted that by introducing the feed liquor immediately in advance of the discharge of the pipe 31, the feed liquor is introduced to the hottest liquor so as to raise the temperature of the incoming liquor quickly in starting coagulation of the proteins.

After the proteins in whey have been thus largely coagulated and distributed and suspended in the liquor, the same, together with the insoluble salts precipitated by the high temperature, can be delivered to an evaporator for removing the bulk of the water content of the liquor and then the concentrated whey can be delivered to a dryer which virtually removes the remaining moisture from the protein bearing liquor and permits of packing the same for the trade as animal fed. While the liquor is passing through the evaporator the coagulated proteins and insoluble salts remain largely in suspension in the evaporator on account of being in a finely divided state due to the agitation of the liquid in passing through the treating apparatus. Any tendency of depositing these coagulated and insoluble materials in the form of hard scale in the evaporator is thus practically eliminated.

By handling the liquor in the manner described the coagulated particles of protein are extremely small in size and can, therefore, be kept in suspension without difficulty.

I claim as my invention:

1. The hereindescribed process of coagulating proteins in dilute, heat coagulable protein bearing liquors, which comprises maintaining a relatively large body of said liquor, withdrawing liquor from said body, heating said withdrawn liquor, returning said heated liquor to said body to maintain the temperature of said body above that at which the proteins start to coagulate, and introducing feed liquor to the liquor in process of coagulation.

2. The hereindescribed process of coagulating proteins in dilute, heat coagulable protein bearing liquor, which comprises maintaining a relatively large body of said liquor, withdrawing liquor from said body, heating said withdrawn liquor, returning said heated liquor to maintain the temperature of said body above that at which the proteins start to coagulate, and introducing feed liquor to the liquor contained in said body and withdrawing a part of the liquor being so returned to said body.

3. The hereindescribed process of coagulating proteins in dilute, heat coagulable protein bearing liquor, which comprises maintaining a relatively large body of said liquor, continuously withdrawing liquor from said body, heating said withdrawn liquor, returning said heated liquor to said body to maintain the temperature of said body above that at which the proteins start to coagulate and continuously introducing feed liquor to the liquor in process of coagulation.

4. The hereindescribed process of coagulating proteins in dilute, heat coagulable protein bearing liquor, which comprises maintaining a relatively large body of said liquor, continuously withdrawing a relatively large volume of liquor from said body, heating said withdrawn liquor, returning said heated liquor to said body to maintain the temperature of said body above that at which the proteins start to coagulate and at a temperature slightly lower than the heating medium applied to said withdrawn liquor, and continuously introducing a relatively small volume of feed liquor to the liquor in process of coagulation.

5. The hereindescribed process of coagulating proteins in dilute, heat coagulable protein bearing liquor, which comprises maintaining a relatively large body of said liquor, continuously withdrawing a relatively large volume of liquor from said body, heating said withdrawn liquor, returning said heated liquor to said body to maintain the temperature of said body above that at which the proteins start to coagulate and continuously introducing a relatively small volume of feed liquor to the heated liquor being returned to said body.

6. The hereindescribed process of coagulating proteins in dilute, heat coagulable protein bearing liquor, which comprises maintaining a relatively large body of said liquor, continuously withdrawing a relatively large volume of liquor from said body, heating said withdrawn liquor, returning said heated liquor to said body to maintain the temperature of said body above that at which the proteins start to coagulate, continuously introducing a relatively small volume of feed liquor to the heated liquor being returned to said body and continuously withdrawing a part of the heated liquor being returned to said body before admixture with said feed liquor.

7. The hereindescribed process of coagulating proteins in whey liquors, which comprises maintaining a relatively large body of said liquor, withdrawing liquor from said body, heating said withdrawn liquor, returning said heated liquor to said body to maintain the temperature of said body above that at which the proteins start to coagulate, and introducing feed liquor to the liquor in process of coagulation.

8. The hereindescribed process of coagulating proteins in whey liquor, which comprises maintaining a relatively large body of said liquor, continuously withdrawing liquor from said body, heating said withdrawn liquor, returning said heated liquor to said body to maintain the temperature of said body above that at which the proteins start to coagulate and continuously introducing feed liquor to the liquor in process of coagulation.

9. The hereindescribed process of coagulating proteins in whey liquor, which comprises maintaining a relatively large body of said liquor, continuously withdrawing a relatively large volume of liquor from said body, heating said withdrawn liquor, returning said heated liquor to said body to maintain the temperature of said body above that at which the proteins start to coagulate and at a temperature slightly lower than the heating medium applied to said withdrawn liquor, and continuously introducing a relatively small volume of feed liquor to the liquor in process of coagulation.

10. The hereindescribed process of coagulating proteins in whey liquor, which comprises maintaining a relatively large body of said liquor, continuously withdrawing a relatively large volume of liquor from said body, heating said withdrawn liquor, returning said heated liquor to said body to maintain the temperature of said body above that at which the proteins start to coagulate, continuously introducing a relatively small volume of feed liquor to the heated liquor being returned to said body and continuously withdrawing a part of the heated liquor being returned to said body before admixture with said feed liquor.

11. The hereindescribed process of coagulating proteins in whey liquors, which comprises maintaining a relatively large body of said liquor, withdrawing liquor from said body, heating said withdrawn liquor and returning said heated liquor to said body to maintain the temperature of said body above that at which the proteins start to coagulate.

CHARLES O. LAVETT.